Jan. 9, 1940.  G. A. ILER  2,186,833
VALVE
Filed March 11, 1939
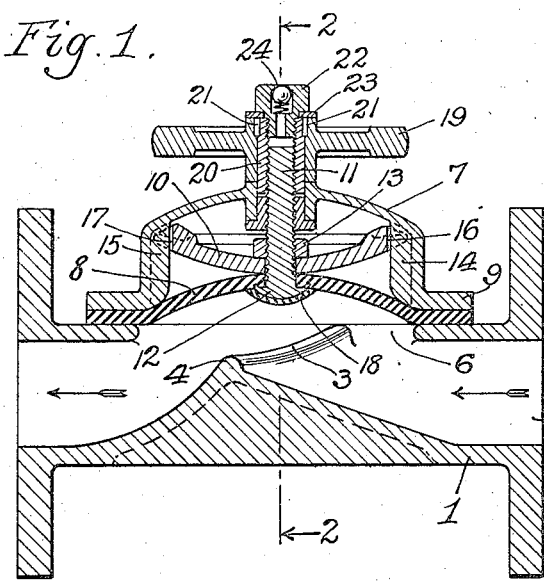
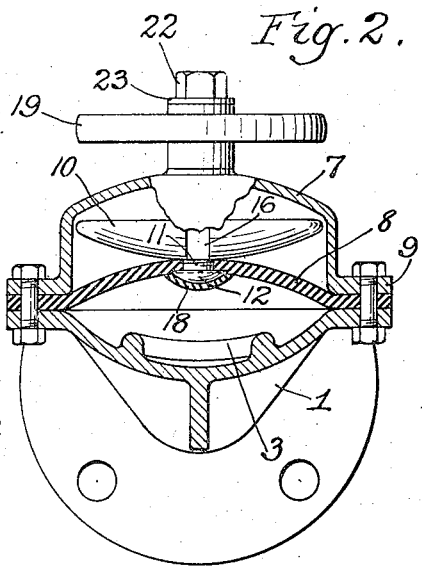
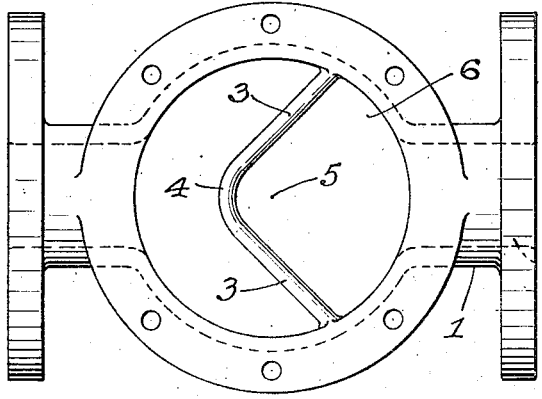
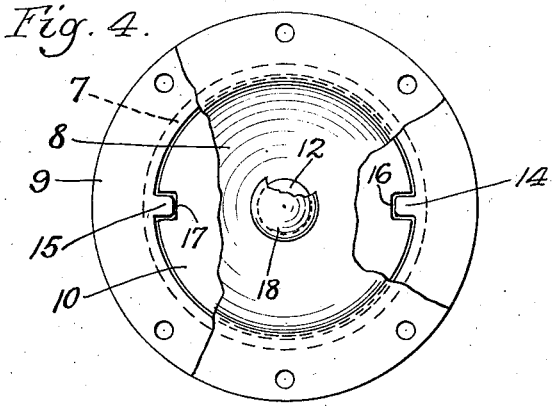
INVENTOR.
George A. Iler.
BY Parker & Carter
ATTORNEY.

Patented Jan. 9, 1940

2,186,833

UNITED STATES PATENT OFFICE 2,186,833

VALVE

George A. Iler, Riverside, Ill.

Application March 11, 1939, Serial No. 261,195

6 Claims. (Cl. 251—24)

This invention relates to valves particularly adapted for use in connecton with liquids and gases and has for its object to provide a new and improved device of this description.

The invention has as a further object to provide a diaphragm valve where the passageway through the valve is closed by a flexible diaphragm moved down to engage a wall which extends across the passageway through the valve, provided with means for preventing the material passing through the valve from bulging the flexible diaphragm and thus tipping the parts so as to put a strain upon the valve stem.

The invention has as a further object to provide a valve of the kind described which is efficient and durable and has a long life.

The invention has further objects which are more particularly pointed out in the accompanying description.

Referring now to the drawing, Fig. 1 is a sectional view through one form of valve embodying the invention;

Fig. 2 is a view in part section, taken on line 2—2 of Fig. 1;

Fig. 3 is a view of the construction shown in Fig. 1 with the cover and diaphragm removed, showing the cross wall; and Fig. 4 is a bottom view of the cover with the diaphragm in position, with parts broken away;

Like numerals refer to like parts throughout the several figures.

Referring now to the drawing, I have shown a construction wherein there is a valve body 1, having a passageway 2 extending therethrough for the liquid or gas. Extending across this passageway is a wall 3. This wall extends across the passageway and is bent so that its middle portion 4 is at one side of the center 5 of the circular opening 6 in the casing. There is a cover 7 for the casing. A flexible diaphragm 8 extends across the opening 2 and is clamped between the casing 1 and the flange 9 of the cover so as to be held in position. There is a rigid follower 10 in the cover 7. The diaphragm 8 and the follower 10 are connected to a valve stem 11. This stem is provided with an enlargement or head 12 at the point where it projects through the diaphragm, this head acting to hold the diaphragm to the valve stem. The valve stem 11 is preferably threaded and there is a nut 13 which clamps the follower 10 and the flexible diaphragm between the nut and the head 12.

Some means is provided for preventing the follower 10 from rotating as it is moved up and down by the movement of the valve stem. As herein shown, this result is secured by providing the cover 7 with guiding projections 14 and 15 on opposite sides thereof, which project into notches 16 and 17 in the edge of the follower, so that as the diaphragm and the follower move up and down, the follower slides along the projections 14 and 15. It will be noted that the means for guiding the follower and for preventing its rotation are not placed at the ends of the wall 3, but are placed over the stream flow, that is, in alignment with the passageway through the valve along which the stream of material flows when the valve is open.

When the valve is used for certain materials which corrode metal, as, for example, acids and alkalies, the head 12 of the valve stem is covered with a rubber cap 18, which is vulcanized to the diaphragm 8, so as to completely cover and protect the head 12. When such materials are passing through the valve, the valve may be provided with a suitable resisting material, such as lead, tin, rubber, glass or the like.

Some means is provided for moving the diaphragm down upon the wall 3. As herein shown, there is a handwheel 19, which when turned in one direction, moves the diaphragm and follower plate down so that the diaphragm engages the wall 3, so as to close the valve, and when moved in the other direction, moves the diaphragm and follower plate up, so as to open the valve. This result is secured by providing a hollow sleeve 20 which has internal screwthreads and which is connected with the handwheel 19 in any desired manner, as by means of pins 21 fitting in opposed recesses in the handwheel and the sleeve 20. This sleeve 20 is provided with internal screwthreads which engage external screwthreads on the valve stem 11. The parts are held in position by a cap 22, there preferably being a washer 23 between the cap and the handwheel, this washer fitting over the recesses into which the pins 21 are located. There is preferably an oil hole 24 for inserting oil so as to properly oil the rotating parts.

By having the wall 3 shaped as shown, with its middle portion at one side of the center of the opening 6 in the valve casing and its ends bent around, it will be seen that the wall is considerably longer than if extending straight across. This gives a much greater area of surface contact between the rubber diaphragm and the wall when the valve is closed, thus providing a much greater support to this flexible diaphragm and reducing the amount of pressure per unit of area, thus insuring a longer life of the diaphragm. Furthermore, due to the fact that the middle portion of the wall is at one side of the center of the opening 6 in the valve casing, it will be seen that the head 12 of the valve stem does not strike the wall, but moves down past it when the valve is closed, thus insuring a proper contact between the rubber diaphragm 8 and the wall 3. When the head 12 of the valve stem is covered with rubber, this rubber, if the wall 3 was directly under it, would press against the wall 3, and since this rubber is comparatively thin, the squeezing of the rubber, due to the pressure, would soon cause a hole to be made in it, thus causing a failure of the valve.

In the use of valves of this kind, the pressure of liquid coming into the valve when it is closed, has a tendency to bulge the flexible diaphragm 8 upwardly, thus tipping the follower plate 10, and this causes bending strain in the valve stem and tends also to throw the opposite side of the follower plate down. The particular shape of the wall as herein shown, that is, this U-shaped wall, provides a means for properly supporting the diaphragm under these conditions, so as to prevent these defects. This therefore insures a much more efficient working of the device and greatly increases its life.

It will be noted that the middle portion of the wall 3 is on the downstream side of the center of the opening 6 and that the ends of said wall, where they connect with the casing 1, are on the upstream side thereof.

I have stated that the head of the valve stem may be covered with rubber, but it is of course evident that it may be covered with any non-corrosive material desired.

I claim:

1. A valve comprising a casing having a passageway therethrough, an opening in said casing, a wall extending crosswise of said passageway, having its middle portion at one side of the center of the said opening in the valve casing and its ends connecting with the valve casing at the other side of the center of said opening, a cover for said opening, a diaphragm having its edges held between the cover and the casing, a follower plate for said diaphragm, a valve stem connecting said follower plate and diaphragm together, said valve stem having a head at one end, clamping means for clamping the follower plate and diaphragm between it and said head, the head of said valve stem being at one side of said wall when the diaphragm is in its closed position, and means for moving said diaphragm into and out of contact with said wall to close and open the valve.

2. A valve comprising a casing having a passageway therethrough, an opening in said casing, a wall extending crosswise of said passageway, having its middle portion at one side of the center of the said opening in the valve casing and its ends connecting with the valve casing at the other side of the center of said opening, a cover for said opening, a diaphragm having its edges held between the cover and casing, a follower plate for said diaphragm, a valve stem connecting said follower plate and diaphragm together, said valve stem having a head at one end, said head being provided with a non-corrosive covering, clamping means for clamping the follower plate and diaphragm between it and said head, the head of said valve stem and the non-corrosive covering thereon being at one side of said wall when the diaphragm is in its closed position, and means for moving said diaphragm into and out of contact with said wall to close and open the valve.

3. A valve comprising a casing having a passageway therethrough, an opening in said casing, a wall extending crosswise of said passageway, having its middle portion at one side of the center of the said opening in the valve casing and its ends connecting with the valve casing at the other side of the center of said opening, a cover for said opening, a diaphragm having its edges held between the cover and the casing, a follower plate for said diaphragm, a valve stem connecting said follower plate and diaphragm together, said valve stem having a head at one end, clamping means for clamping the follower plate and diaphragm between it and said head, the head of said valve stem being at one side of said wall when the diaphragm is in its closed position, means for moving said diaphragm into and out of contact with said wall to close and open the valve, and guiding devices for opposed edges of said follower plate, said guiding devices being substantially in alignment with the passageway in the valve casing along which the material flows.

4. A valve comprising a casing having a passageway therethrough, an opening in said casing, a U-shaped wall extending crosswise of said passageway and located below said opening, said wall having its central portion at one side of the center of said opening and its ends at the other side of the center of said opening, a cover covering said opening, a diaphragm movably mounted in said casing, and means for moving said diaphragm so as to bring it into contact with said U-shaped wall to close the valve.

5. A valve comprising a casing having a passageway therethrough, an opening in said casing, a U-shaped wall extending crosswise of said passageway and located below said opening, said wall having its central portion at one side of the center of said opening on the downstream side thereof, and its ends at the other side of the center of said opening on the upstream side thereof, a cover covering said opening, a diaphragm movably mounted in said casing, and means for moving said diaphragm so as to bring it into contact with said U-shaped wall to close the valve.

6. A valve comprising a casing having a passageway therethrough, an opening in said casing, a wall extending crosswise of said passageway, having its middle portion at one side of the center of the said opening in the valve casing and its ends connecting with the valve casing at the other side of the center of said opening, a cover for said opening, a diaphragm having its edges held between the cover and the casing, a follower plate for said diaphragm, a valve stem connecting said follower plate and diaphragm together, said valve stem having a head at one end, clamping means for clamping the follower plate and diaphragm between it and said head, the head of said valve stem being at one side of said wall when the diaphragm is in its closed position, said valve stem being externally threaded, an internally threaded sleeve surrounding said valve stem and in engagement therewith, a controlling handle with which said sleeve is connected, and means for preventing longitudinal movement of said sleeve when the handle is operated, whereby the diaphragm may be moved toward and away from said wall.

GEORGE A. ILER.